United States Patent
Davis

(10) Patent No.: US 10,599,822 B2
(45) Date of Patent: Mar. 24, 2020

(54) SYSTEM AND METHOD OF SECURE DATA ENTRY

(71) Applicant: ASSA ABLOY AB, Stockholm (SE)

(72) Inventor: Masha-Leah Davis, Austin, TX (US)

(73) Assignee: ASSA ABLOY AB, Stockholm (SE)

( * ) Notice: Subject to any disclaimer, the term of this patent is extended or adjusted under 35 U.S.C. 154(b) by 11 days.

(21) Appl. No.: 15/948,416

(22) Filed: Apr. 9, 2018

(65) Prior Publication Data

US 2018/0293368 A1    Oct. 11, 2018

Related U.S. Application Data

(60) Continuation of application No. 15/407,794, filed on Jan. 17, 2017, which is a division of application No. 14/006,329, filed as application No. PCT/US2011/029142 on Mar. 21, 2011, now abandoned.

(51) Int. Cl.
| | | |
|---|---|---|
| *G06F 21/31* | (2013.01) | |
| *G06F 3/0488* | (2013.01) | |
| *G06F 3/0484* | (2013.01) | |
| *G06F 21/36* | (2013.01) | |
| *G06F 21/83* | (2013.01) | |
| *G06F 3/023* | (2006.01) | |

(52) U.S. Cl.
CPC .......... *G06F 21/316* (2013.01); *G06F 3/0236* (2013.01); *G06F 3/04842* (2013.01); *G06F 3/04847* (2013.01); *G06F 3/04883* (2013.01); *G06F 21/31* (2013.01); *G06F 21/36* (2013.01); *G06F 21/83* (2013.01)

(58) Field of Classification Search
CPC .... G06F 21/316; G06F 3/04883; G06F 21/83; G06F 3/04842

USPC ...................................................... 726/22–30
See application file for complete search history.

(56) References Cited

U.S. PATENT DOCUMENTS

| | | |
|---|---|---|
| 4,100,534 A | 7/1978 | Shifflet, Jr. |
| 4,221,975 A | 9/1980 | Ledniczki et al. |
| 4,333,090 A | 6/1982 | Hirsch |
| 4,369,973 A | 1/1983 | D'Aurora et al. |
| (Continued) | | |

FOREIGN PATENT DOCUMENTS

| | | |
|---|---|---|
| WO | WO 2010/123485 | 10/2010 |
| WO | WO-2012128750 A1 | 9/2012 |

OTHER PUBLICATIONS

Fischer et al., "A Pattern for Secure Graphical User Interface Systems," 2009 20th International Workshop on Database and Expert Systems Application Year: 2009 | Conference Paper | Publisher: IEEE.*

(Continued)

*Primary Examiner* — Roderick Tolentino
(74) *Attorney, Agent, or Firm* — Schwegman Lundberg & Woessner, P.A.

(57) ABSTRACT

A computational device having a user interface is disclosed, the user interface enables a user to securely enter data into the computational device. In particular, the user interface may include a user input portion and a user output portion. The user input portion may be partitioned into a number of input zones, each having a data value associated therewith that when engaged by a user causes the data value associated with the engaged input zone to be provided as input to the computational device.

21 Claims, 7 Drawing Sheets

(56) References Cited

U.S. PATENT DOCUMENTS

| | | |
|---|---|---|
| 4,479,112 A | 10/1984 | Hirsch |
| 4,502,048 A | 2/1985 | Rehm |
| 4,644,326 A | 2/1987 | Villalobos et al. |
| 4,806,745 A | 2/1989 | Oogita |
| 5,600,324 A | 2/1997 | Reed et al. |
| 5,949,348 A | 9/1999 | Kapp et al. |
| 5,970,146 A | 10/1999 | McCall et al. |
| 6,049,790 A | 4/2000 | Rhelimi |
| 6,088,017 A | 7/2000 | Tremblay et al. |
| 6,317,835 B1 | 11/2001 | Bilger et al. |
| 6,434,702 B1 | 8/2002 | Maddalozzo, Jr. et al. |
| 6,549,194 B1 | 4/2003 | McIntyre et al. |
| 7,479,949 B2 | 1/2009 | Jobs et al. |
| 9,183,554 B1 | 11/2015 | Courtright et al. |
| 2003/0014239 A1* | 1/2003 | Ichbiah ............... G06F 3/0233 704/7 |
| 2005/0044425 A1 | 2/2005 | Hypponen |
| 2006/0164230 A1 | 7/2006 | Dewind et al. |
| 2007/0080934 A1* | 4/2007 | Chen ................... G06F 3/0383 345/156 |
| 2008/0165149 A1* | 7/2008 | Platzer ................ G04G 11/00 345/173 |
| 2008/0316183 A1* | 12/2008 | Westerman ........... G06F 3/0416 345/173 |
| 2009/0013393 A1* | 1/2009 | Xi ........................... G06F 21/31 726/7 |
| 2009/0227232 A1* | 9/2009 | Matas ................. H04M 1/665 455/411 |
| 2010/0039220 A1 | 2/2010 | Davis |
| 2010/0066688 A1* | 3/2010 | Jeon ....................... G06F 3/017 345/173 |
| 2010/0141609 A1 | 6/2010 | Frisbee |
| 2010/0149092 A1 | 6/2010 | Westerman et al. |
| 2010/0289761 A1 | 11/2010 | Kajiyama |
| 2010/0313125 A1 | 12/2010 | Fleizach et al. |
| 2011/0018793 A1 | 1/2011 | Chen et al. |
| 2011/0179381 A1 | 7/2011 | King |
| 2011/0199386 A1 | 8/2011 | Dharwada et al. |
| 2011/0316791 A1* | 12/2011 | Jiang ..................... G06F 3/0233 345/173 |
| 2012/0089950 A1* | 4/2012 | Tseng ................. G06F 3/04883 715/854 |
| 2012/0162083 A1* | 6/2012 | Zhu ..................... G06F 3/04886 345/168 |
| 2014/0173717 A1 | 6/2014 | Davis |
| 2017/0154175 A1 | 6/2017 | Davis |

OTHER PUBLICATIONS

Li et al., "A Secure User Interface for Web Applications Running Under an Untrusted Operating System," 2010 10th IEEE International Conference on Computer and Information Technology Year: 2010 | Conference Paper | Publisher: IEEE.*

International Search Report and Written Opinion for International (PCT) Patent Application No. PCT/US11/29142, dated May 19, 2011 8 pages.

International Preliminary Report on Patentability for International (PCT) Patent Application No. PCT/US2011/029142, dated Oct. 3, 2013 8 pages.

Extended Search Report for European Patent Application No. 11861633.3, dated Aug. 8, 2014 5 pages.

Official Action for European Patent Application No. 11861633.3, dated Dec. 15, 2016 4 pages.

Official Action for U.S. Appl. No. 14/006,329, dated Sep. 4, 2015 31 pages.

Official Action for U.S. Appl. No. 15/407,794, dated Nov. 9, 2017 16 pages.

"U.S. Appl. No. 14/006,329, Notice of Non-Compliant Amendment dated Apr. 29, 2016", 3 pgs.

"U.S. Appl. No. 14/006,329, Notice of Non-Compliant Amendment dated Sep. 15, 2016", 3 pgs.

"U.S. Appl. No. 14/006,329, Preliminary Amendment filed Sep. 20, 2013", 3 pgs.

"U.S. Appl. No. 14/006,329, Response filed Mar. 1, 2016 to Non Final Office Action dated Sep. 4, 2015", 10 pgs.

"U.S. Appl. No. 14/006,329, Response filed Jun. 29, 2016 to Notice of Non-Compliant Amendment dated Apr. 29, 2016", 6 pgs.

"U.S. Appl. No. 15/407,794, Preliminary Amendment filed Feb. 13, 2017", 4 pgs.

"European Application Serial No. 11861633.3, Communication Pursuant to Article 94(3) EPC dated Dec. 15, 2016", 4 pgs.

"International Application Serial No. PCT/US2011/029142, International Search Report dated May 19, 2011", 2 pgs.

"International Application Serial No. PCT/US2011/029142, Written Opinion dated May 19, 2011", 5 pgs.

\* cited by examiner

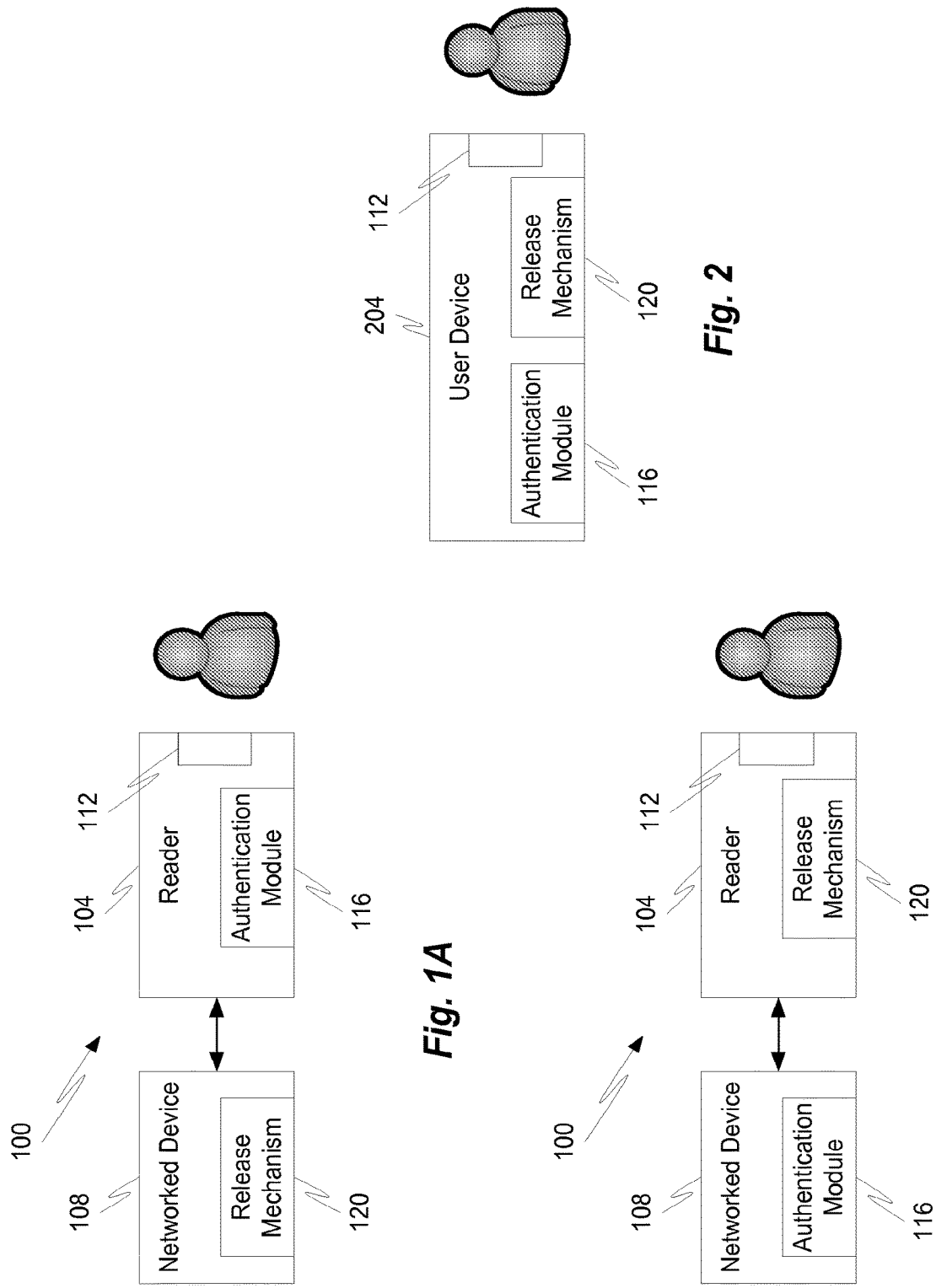

SYSTEM AND METHOD OF SECURE DATA ENTRY

CROSS-REFERENCE TO RELATED APPLICATION

This application is a continuation of U.S. patent application Ser. No. 15/407,794, filed Jan. 17, 2017, which is a division of U.S. patent application Ser. No. 14/006,329, filed Dec. 17, 2013, which is a national stage application under 35 U.S.C. 371 of PCT Application No. PCT/US2011/029142, having an international filing date of Mar. 21, 2011, which designated the United States, each of which is hereby incorporated by reference in its entirety.

FIELD OF THE DISCLOSURE

The present disclosure is generally directed toward data entry into user devices and particularly toward mechanisms for securing the same.

BACKGROUND

Secure and private entry of data has always been a major concern in systems intended to control access to a resource or a facility. In many such systems such as those used in the physical and logical access control industries, restricted access is provided to a select group of users via a numeric keypad alone or a keypad incorporated into a reader. These keypads typically have a set of numbers plus special symbols (characters) that are exposed to the user side for data entry. These characters are connected to an electronic device with intelligence to recognize the characters entered (decode) and compare them to the code required to provide entrance to the system. Sometimes this device does not actually process the entered code and instead, transmits this to another device to actually perform the comparison. The users interact with the system by pressing the appropriate characters that represent an access code or password specifically chosen for that system. Examples of such keypads are those employed at credit card terminals, burglar alarm keypads, and access control keypads.

Traditional keypads have static configurations. They generally consist of numbered buttons ranging from 0 through 9 and an "*" and a "#" button much like a typical telephone keypad. Such numbers exist in a common pattern and hence the user or anyone with knowledge of the pattern can simply enter the code without looking at numbers on the keypad. While this is particularly useful for users with sight impairments, it negatively impacts the security of the system because patterns can be deduced more easily than the codes themselves.

One example of the utilization of such keypads is in parking applications such as entrance to a parking facility or a residential gated community which have gated entrances secured with an access control keypad. To gain entry to the secured area, a user must provide the keypad with a valid a security code. All individuals with permission to enter the facility are provided with a common security/access code which opens the gate and allows entry on to the premises. Usage in which all individuals have the same password are typically referred to as "common code" systems.

In single common code systems, the numbers or range of possible numbers (i.e., the number of possible combinations) which make up a user's password is finite and can be deduced in several ways. A non-authorized user may observe a user and the patterns typed in, significantly reducing the security of the system. Additionally, the non-authorized user may acquire the password by analyzing the physical keypads for wear. Wear indicates high utilization and would also significantly narrow down the range of possibilities. More sophisticated methods of compromising such systems include "dusting" the keys or applying non-visible material in an attempt to determine which keys comprise the password.

In statistical measure, if we assume a typical keypad with digits 0 through 9 and an "*" and "#" button, if the access code is four digits, then the probability of guessing the correct code is (1/9!*1/4!) or 1 chance in 157,464. However, assume that the user can reduce the digits used to the four most commonly utilized digits based on the wear of the keypad numbers. This probability then reduces to (1/4!) or 1 chance in 24.

For these reasons and more, it would be desirable to have an improved method for increasing security of systems accessed utilizing security keypads. Additionally, it would be desirable to have such an improved method for increasing security of systems wherein the keypad configuration changes automatically after each or a series of user interfaces.

Some solutions have been proposed to address the above-described problem. One common example is referred to as a Hirsch ScramblePad®. The particular construction of the Hirsch ScramblePad® is described in detail in one or more of U.S. Pat. Nos. 4,333,090; 4,479,112; and 4,644,326; all of which are hereby incorporated herein by reference in their entirety. The main concept behind the Hirsch ScramblePad® is to randomize the number which is assigned to a given key for every instance a user is required to provide input via the keypad. This means that the same valid code will not be entered with the same pattern. Rather, different physical keys will need to be depressed to enter the same valid code at different times. Accordingly, the idea of utilizing a variable keypad addresses many of the security concerns described above. Other mechanisms for securing user input are described, for example, in U.S. Pat. Nos. 4,100,534; 4,221,975; 4,369,973; 4,502,048; 4,806,745; 5,949,348; 5,970,146; 6,049,790; 6,317,835; 6,434,702; 6,549,194; and 7,479,949; all of which are hereby incorporated herein by reference in their entirety.

A problem common to all of the above-noted solutions is that they are complex and, therefore, very costly to implement. Implementing these solutions in many situations becomes cost-prohibitive. Accordingly, there exists a need for a secure yet cost-effective mechanism for securing data entries of a user.

SUMMARY

It is, therefore, one aspect of the present disclosure to provide a secure and cost-effective solution for securing data entries of a user in a computational device. In particular, embodiments of the present disclosure propose solutions in which the confidentiality of user inputs are protected-by a combination of visual data scrambling and off-angle viewing techniques. The proposed solutions can be implemented at a fraction of the cost of existing solutions.

In one embodiment of the present disclosure, a user input is provided which includes a linear position sensor that is configured to determine if a user's finger is touching the user input as well as the position of where the sensor is being touched. As a user's finger is touching the user input, the user is required to slide their finger along the user input in a scrolling motion. As the user scrolls their finger across the user input and, therefore, across a number of input zones, a user output displays the data value currently corresponding to the input zone where the user's finger is located. When the user sees that the desired data value is depicted by the user output, the user removes their finger from the user input and the data value currently corresponding to the input zone where the user's finger was last located is provided as a data input for a computational device. This process can be repeated until the user has entered the entire password.

When the number of digits in the password is not a fixed number, then we can add an additional symbol to the set of characters that are displayed as the user slides his finger along the user input device. This symbol e.g., "E" for enter, is used as a terminator to indicate that all of the data has been entered.

Since it is possible that the user has incorrectly entered data, we need to provide a way for the user to clear the previous entries and start again. This can be accomplished by the use of an additional symbol. When the user slides his finger and this symbol is displayed, e.g., "C" for clear, then the input data is cleared and the process starts again.

The linear input sensor may be comprised of a linear resistor, linear capacitive element, a full finger biometric sensor, a swipe biometric sensor, and a touch-sensitive screen such as what is used on the Apple iPhone®. This linear sensor may be constructed in a straight line or can be in shapes or even circular and could even be incorporated into the handle of a door lock in which the motion is twisting left or right.

One or more additional security mechanisms may be employed to further enhance the security with which user inputs are captured. As one example, the input zones of the user input may be re-assigned random and different data values for every instance where a user input is to be captured. As another example, they could be arranged in ascending order and then descending order. As another example, the size and/or configuration of the input zones themselves may be altered for every instance where a user input is to be captured. As another example, a number of different types of user output may be utilized ranging between a single digit display, a multi-digit display, and a touch-screen that incorporates the user output into the same area as the user input.

In some embodiments, it may also be possible to capture one or more parameters (e.g., applied pressure, slide speed, fingerprint, finger size, etc.) of a user's input. The captured parameters may be mathematically/statistically assessed over a number of valid user inputs and after an appropriate number of valid user inputs have been received and the associated parameters have been incorporated into an average (or mean or some other value obtained from a mathematical formula), the average of the captured parameters can be compared to the current parameter and, if different by a certain amount, may be used to detect potentially suspect user inputs.

It is another aspect of the present disclosure to provide a privacy shielding material over the user output to limit off-axis viewing of the user output such as 3M Vikuiti™ Light Control Film. For stronger off-axis viewing protection, the user output may be recessed within the computational component and louvers may be utilized.

It is another aspect of the present disclosure to provide interchangeable snap-in bezels which enable an input mode of the computational device to be altered. In one input mode, a scrambling keypad may be employed where a user is required to slide their fingers in a groove and across a user input device, such as the one of the several variations described above, to achieve a user input. In another input mode, a traditional keypad with numbers in standard locations could be used to achieve user input. In another mode, a gesturing keypad may be utilized whereby a plurality of intersecting grooves are provided and a user is required to slide their fingers in various patterns across the intersecting grooves to achieve the desired user input.

The present invention will be further understood from the drawings and the following detailed description. Although this description sets forth specific details, it is understood that certain embodiments of the invention may be practiced without these specific details. It is also understood that in some instances, well-known circuits, components and techniques have not been shown in detail in order to avoid obscuring the understanding of the invention.

BRIEF DESCRIPTION OF THE DRAWINGS

The present disclosure is described in conjunction with the appended figures:

FIG. 1A is a block diagram of an access control system having a first configuration in accordance with embodiments of the present disclosure;

FIG. 1B is a block diagram of an access control system having a second configuration in accordance with embodiments of the present disclosure;

FIG. 2 is a block diagram of a user device in accordance with embodiments of the present disclosure;

DETAILED DESCRIPTION

Figure 3:
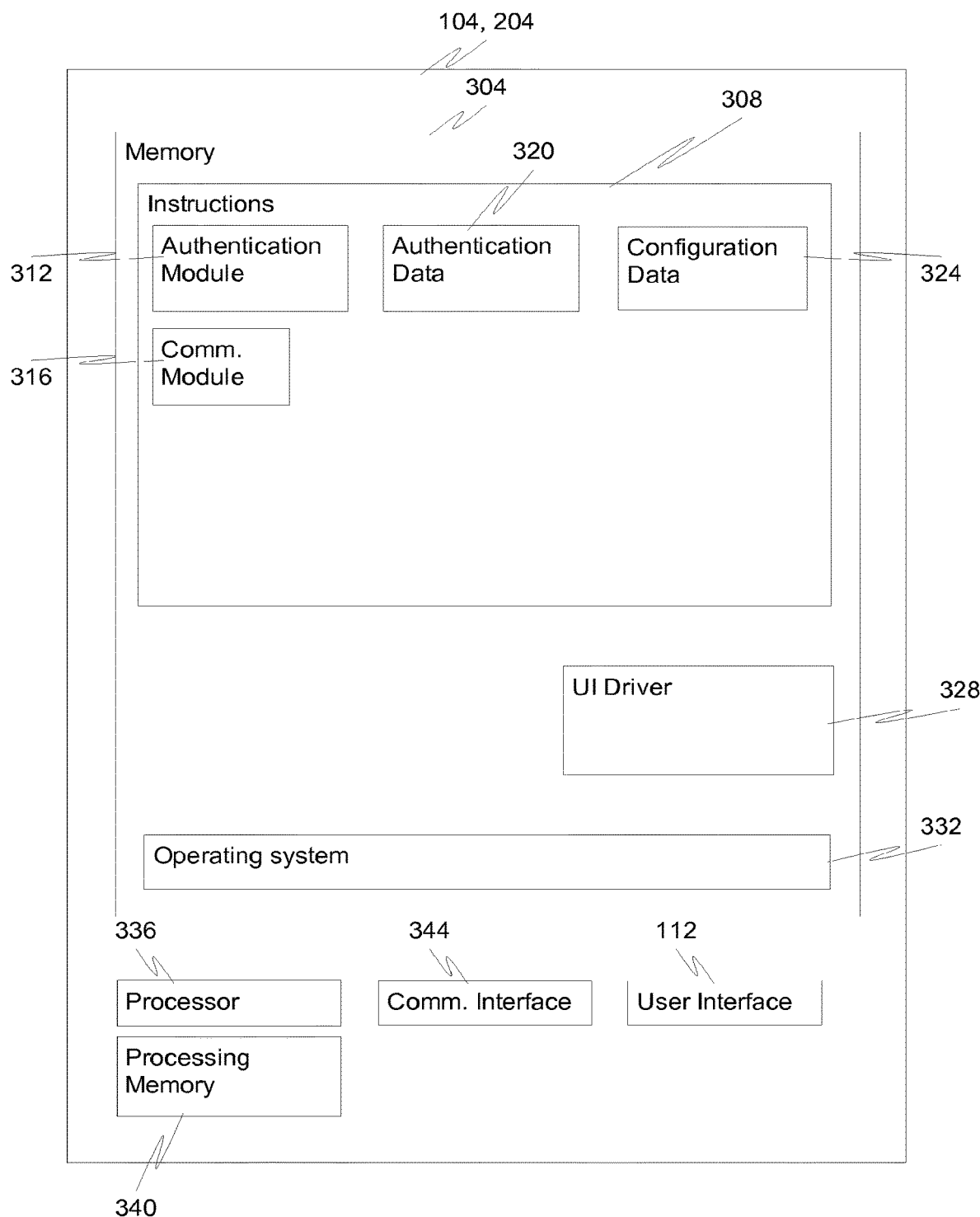
FIG. 3 is a block diagram depicting details of a reader/user device in accordance with embodiments of the present disclosure.

The ensuing description provides embodiments only, and is not intended to limit the scope, applicability, or configuration of the claims. Rather, the ensuing description will provide those skilled in the art with an enabling description for implementing the described embodiments. It being understood that various changes may be made in the function and arrangement of elements without departing from the spirit and scope of the appended claims.

FIGS. 1A and 1B show illustrative embodiments of an access control system 100 in accordance with embodiments of the prior art. Both configurations of the access control system 100 include a reader 104 that is generally provided at a strategic location to secure one or more assets. In some embodiments, the reader 104 is in communication with a networked device 108 via a first communication link. The first communication link between the reader 104 and networked device 108 may be established over a secured or unsecured communication network via TCP/IP, Wi-Fi, Zigbee, Cellular modem, RS485, current loop, and Wiegand. Such a reader 104 is referred to as a networked reader because the reader 104 provides some or all data used in making an access control decision to the networked device 108. In the embodiment depicted in FIG. 1B, the networked device 108 comprises the necessary functionality, in the form of an authentication module 116, to analyze the data received from the reader 104 and make an access control decision for the reader 104. A control panel is one example of a networked device 108 which is typically used in the access control industry. Other types of networked devices 108 include a host computer with or without a web server, a server providing Software as a Service (SaaS), a cloud-based application, or the like.

After the access control decision has been made at the authentication module 116 of the networked device 108, the networked device 108 communicates the results of the decision back to the reader 104, which comprises a release mechanism 120 that is enabled to either release one or more assets if a decision has been made to grant access or maintain such assets in a secure state if a decision has been made to deny access. For access control applications, the release mechanism 120 is typically a relay whereas in logical access applications, the release mechanism 120 is realized by software instructions.

In an alternative configuration depicted in FIG. 1A, the release mechanism 120 may be provided in the networked device 108 and the authentication module 116 may be provided in the reader 104. In this configuration, the reader 104 may make the access control decisions and report the results of those decisions to the networked device 108 which selectively activates the release mechanism 120 depending upon the results of the decision made by the authentication module 116.

One function of a reader 104 is to control access to certain assets. More specifically, a reader 104 may be positioned at an access point for a given asset (e.g., a door for a room, building, or safe, a computer for electronic files, and so on). Unless a user provides the reader 104 with a valid input via a user interface 112 of the reader 104, the access point is maintained in a secure state such that admittance or access to the asset is denied. If a user enters a valid input via the user interface 112, then the reader 104 has the discretion to allow the user access to the asset and implement various other actions accordingly.

Although the reader 104 is depicted as having only a user interface 112, one skilled in the art will appreciate that the reader 104 may be configured to read data from an access control credential carried by the user in addition to receiving user input from the user. A credential is a device that carries evidence of authority, status, rights, and/or entitlement to privileges for a holder of the credential. A credential is a portable device having memory and a reader interface (i.e., an antenna and Integrated Circuit (IC) chip) which enables the credential to exchange data with the reader 104, usually via a credential interface of the reader 104. One example of a credential is an RFID smartcard that has data stored thereon allowing a holder of the credential to access an asset protected by a reader 104. Other examples of a machine-readable credential include, but are not limited to, proximity RFID-based cards, access control cards, credit cards, debit cards, passports, identification cards, key fobs, Near Field Communications (NFC)-enabled cellular phones, Personal Digital Assistants (PDAs), tags, or any other device configurable to emulate a virtual credential.

In embodiments where the reader 104 is configured to receive both user input via the user interface 112 and credential input from a credential carried by the user, the reader 104 is capable of performing dual-factor authentication by verifying both the validity of user input (i.e., something that the user knows) as well as the validity of credential input (i.e., something that the user has). The reader 104 may also be configured to receive biometric input from the user to further enhance the security of the access control system 100.

As noted above, the networked device 108 may be responsible for making some or all of the asset-access decisions based on data received at the reader 104 from the user. In some embodiments, the reader 104 may not be connected to a networked device 108, in which case the reader 104 is referred to as a stand-alone reader. Stand-alone readers comprise the decision-making components necessary to analyze input received from a user and determine, based on the received input, if the user is entitled to access an asset secured by the reader 104. The access control rules for entry including time zone, day of week, etc. may be contained in a database in the stand-alone reader that is programmable by methods including using the keypad itself, using a PDA or mobile phone via NFC, infrared light, audio, or a wired connection. In some cases, the access control decision rules may be contained in the machine-readable credential read at the reader incorporated into the stand-alone device/user input combination. Stand-alone readers are generally desirable in situations where a reader 104 is in an isolated location and a communication link between the networked device 108 and reader 104 is not easily established.

In configurations where the reader 104 is a networked reader, a communications network may be used to establish the communication link between the reader 104 and networked device 108. Exemplary communication networks may provide bi-directional communication capabilities, which may selectively be implemented in a form of wired, wireless, fiber-optic communication links, or combinations thereof. Even though the communication link between the networked device 108 and reader 104 is depicted as bi-directional, one skilled in the art can appreciate that the communication link may be unidirectional. As one example, the reader 104 may utilize the Wiegand protocol to communicate with the networked device 108.

The communication link between the reader 104 and networked device 108 may be implemented utilizing buses or other types of device connections. The protocols used to communicate between the networked device 108 and the reader 104 may include one or more of the TCP/IP protocol, RS 232, RS 485, Current Loop, Power of Ethernet (POE), Bluetooth, Zigbee, GSM, WiFi, and other communication methods and protocols known in the art.

The networked device 108 may be a general-purpose computer adapted for multi-task data processing and suitable for use in a commercial setting. Alternatively, the networked device 108 may be implemented as a host computer or server and the reader 104 can be connected to the host computer via a TCP/IP connection or other type of network connection. A memory comprising a database of records for the system 100 may be associated with the networked device 108. The database, although not depicted, may be integral with or separated from the networked device 108 or it may be incorporated into the reader 104. The database maintains records associated with the readers 104, users, algorithm(s) for acquiring, decoding, verifying, and modifying data contained in the readers 104, algorithm(s) for testing authenticity and validity of user inputs, algorithm(s) for implementing actions based on the results of these tests, and other needed software programs. Specific configurations of the networked device 108 are determined based on and compliant with computing and interfacing capabilities of the readers 104.

FIG. 2 depicts an exemplary user device 204, which may be equipped with a user interface 112 that is similar or identical to the user interface 112 of the reader 104. The user device 204 may correspond to any type of device capable of performing one or more actions based on input received at the user interface 112. Although not depicted, the user device 204 may also be connected to a communication network and may be configured to exchange messages with networked devices 108 via the network. Examples of a user device 204 include, without limitation, a computer, laptop, netbook, iPad®, iPod®, iPhone®, mobile/cellular phone, telephone, Personal Digital Assistant (PDA), or the like.

With reference now to FIG. 3, additional details of a reader 104 and/or user device 204 (collectively referred to hereinafter as a "computational device 104, 204") will be described in accordance with embodiments of the present invention. The computational device 104, 204 may comprise memory 304 that includes a number of instructions 308, modules, and other data structures as well as a processor 336 for executing the instructions 308 and other contents of memory 304.

The computational device 104, 204 may also include a communication interface 344 which allows the computational device 104, 204 to communicate with a networked device 108. Exemplary types of communication interfaces 344 include, without limitation, an RF antenna and driver, an infrared port, a fiberoptics interface, a Universal Serial Bus (USB) port, an Ethernet port, a serial data port, a parallel data port, any type of interface which facilitates communications over a packet-based communication network, such as the Internet, and so on.

The computational device 104, 204 may further include a credential interface (not depicted) which enables the computational device 104, 204 to communicate with one, two, three, or more different types of credentials. The type of credential interface provided on the computational device 104, 204 may vary according to the type of credential that is in the system 100. In some embodiments, the credential interface includes one or more of an antenna, an array of antennas, an infrared port, an optical port, a magnetic stripe reader, a barcode reader or similar machine-vision components, a Near Field Communications (NFC) interface, or any other component or collection of components which enables the computational device 104, 204 to communicate with credentials and other portable memory devices. In some embodiments, the credential interface enables the computational device 104, 204 to read one or more non-RFID machine-readable credentials including one or more of magnetic stripe cards, bar codes, Wiegand cards, Hollerith, infrared, Dallas 1-wire, and barium ferrite.

In some embodiments, the credential interface and communication interface 344 are of the same type (i.e., RF communication interfaces). In some embodiments, the credential interface and communication interface 344 are implemented as a single interface. Thus, the computational device 104, 204 may be enabled to communicate with credentials and networked devices 108 by using the same hardware components.

In addition to a communication interface 344, the computational device 104, 204 may include a user interface 112 which facilitates user interaction between the computational device 104, 204 and a user thereof. As will be discussed in further detail herein, the user interface 112 may include one or more user inputs, one or more user outputs, or a combination user input/output. Exemplary user inputs include, without limitation, keypads (traditional or laser-projected), buttons, switches, a linear pressure sensor (e.g., linear potentiometer that is resistive and/or capacitive), a peripheral device such as a touch pad peripheral included as part of a PC or as a separate peripheral connected by, for example, USB, a mouse/trackball wheel, a mouse or trackball movement, optical detection technologies, pressure sensitive device, resistive, capacitive touch, electrostatic, or magnetic screen enabled to detect finger and pen input, rotating door knob, combination, lock, or the like. Exemplary user outputs include, without limitation, lights, display screens (projection, LCD, LED, OLED, plasma, etc.), individual LEDs, seven segment LED display, multi-digit LED display, etc. In some embodiments, the user output may also be provided with a privacy shielding material, such as 3M's Vikuiti™ product. The privacy shielding material may help ensure that off-axis viewing of the user output is minimized. For an even stronger protection against off-axis viewing, a louver may be utilized which recesses the actual display portion of the user output within a cavity that limits the field of view to the display portion. Exemplary combination user input/outputs may include a touch-screen interface, a multi-touch-screen interface (i.e., a touch-screen interface adapted to recognize multiple simultaneous touches, gestures, "pinches") or any other type of interface which is capable of simultaneously displaying a user output and receiving a user input.

In addition to memory 304, the computational device 104, 204 may also include processing memory 340, which may be in the form of a Randomly Accessible Memory (RAM), cache memory, or any other type of memory used to facilitate efficient processing of instructions 208 by the processor 336.

Whereas the processing memory 340 is used to temporarily store data during processing tasks, the memory 304 is provided to store permanent instructions 308 which control the operational behavior of the computational device 104, 204. The memory 304 and/or 340 may be implemented using various types of electronic memory generally including at least one array of non-volatile memory cells (e.g., Erasable Programmable Read Only Memory (EPROM) cells or FLASH memory cells, etc.) The memory 304 and/or 340 may also include at least one array of dynamic random access memory (DRAM) cells. The various routines and modules which may be included in memory 304 comprise one or more of an authentication module 312, authentication data 320, a communication module 316, and configuration data 324.

The communication module 316 provides instructions which enable the computational device 104, 204 to communicate with other devices. In particular, the communication module 316 may comprise message encoding and/or decoding instructions, message encryption and/or decryption instructions, compression and/or decompression instructions, trans-coding instructions, and any other known type of instructions which facilitate communications over a communications network. For example, the communication module 316 may comprise instructions which enable the computational device 104, 204 to create one or more messages or communication packets which are appropriately formatted and transmitted in accordance with a known communication protocol via the communication interface 344. Likewise, the communication module 316 may also comprise instructions which enable the computational device 104, 204 to format messages received over the communication interface 344 for processing by various other components of the computational device 104, 204.

Another module which may be provided in the instructions 308 is an authentication module 312 that is capable of receiving data from the user input portion of the user interface 112, analyzing the received data, and determining if the received data corresponds to valid data. In some embodiments, the authentication module 312 may refer to authentication data 320 which is also stored in memory 304. In some embodiments, the authentication data 320 may comprise a list of valid or authorized credentials and their corresponding credential data. Alternatively, the authentication data 320 may comprise algorithms for analyzing received data and determining if such data is valid.

Configuration data 324 may also be maintained in memory 304. In some embodiments, the configuration data 324 describes operating characteristics of the computational device 104, 204 such as model number, firmware version(s), software version(s), computational device 104, 204 identifier, and other data which describes the computational device 104, 204. The characteristics of computational device 104, 204 may be inherent characteristics or provisioned characteristics.

Although not depicted, the memory 304 may also contain heuristic instructions for detecting attacks on the computational device 104, 204 or other components of the access control system 100. Details of a computational device 104, 204 configured with embedded attack detection heuristics is further described in U.S. Patent Publication No. 2010/0039220 to Davis, the entire contents of which are hereby incorporated herein by reference. Other components of memory 204 may include a User Interface (UI) driver 328 and an operating system 332, which is a high-level application that facilitates interactions between various other modules and applications in memory 204 and hardware components of the computational device 104, 204. The UI driver 328 may be responsible for facilitating operations of the user interface 112. In some embodiments, the UI driver 328 includes commands for determining when user inputs are received at the user interface 112, identifying parameters of user inputs received at the user interface 112, conditioning parameters of use inputs received at the user interface 112 into data values which can be processed by the modules contained in memory 304, determining what and when to display data as an output at the user interface 112, and the like. In other words, the UI driver 328 may contain any commands necessary to provide a secure user interface 112 as described herein.

The processor 336 may include any general-purpose programmable processor, digital signal processor (DSP) or controller for executing application programming. Alternatively, the various modules described herein may be implemented as hardware or firmware rather than software and the processor 304 may comprise a specially configured Application Specific Integrated Circuit (ASIC).

With reference now to FIGS. 4A-D, an exemplary user interface 112 and process for securely entering data via the user interface 112 will be described in accordance with at least some embodiments of the present disclosure. The process depicted and described enters the simple number combination of "639". As can be appreciated, alphanumeric inputs and more complicated data values may be utilized and the example depicted in FIGS. 4A-D is merely illustrative of one type of data input which can be realized with the user interface 112 of the present disclosure.

Also, although a user's finger is depicted as providing the input on a user input portion 404, any other type of mechanism may be utilized to interact with the user input portion 404. For example, the user may interact with the user input portion 404 with a stylus, pen, mouse, etc.

The user interface 112 may comprise both a user input portion 404 and a separate user output portion 408. The user input portion 404 may comprise a number of input zones 412a-N, each corresponding to a different input value. A user engages the user interface 112 by touching the user input portion 404. In some embodiments, the touching of the user input portion 404 is detected by a pressure-sensitive user input portion 404. In some embodiments, the user input portion 404 may be configured with optics which detects a user's input by taking a plurality of images and determining that the user's finger is engaged with and moving across the user input portion 404. As the user slides their finger across the user input portion 404 in the direction of arrow 420, the user input zones 412a-N are sequentially activated and deactivated (i.e., the data value corresponding to the input zone 412 where the user's finger is currently detected is displayed via the user output portion 408), based on detection of the user's finger within a particular user input zone 412.

Figure 4A:
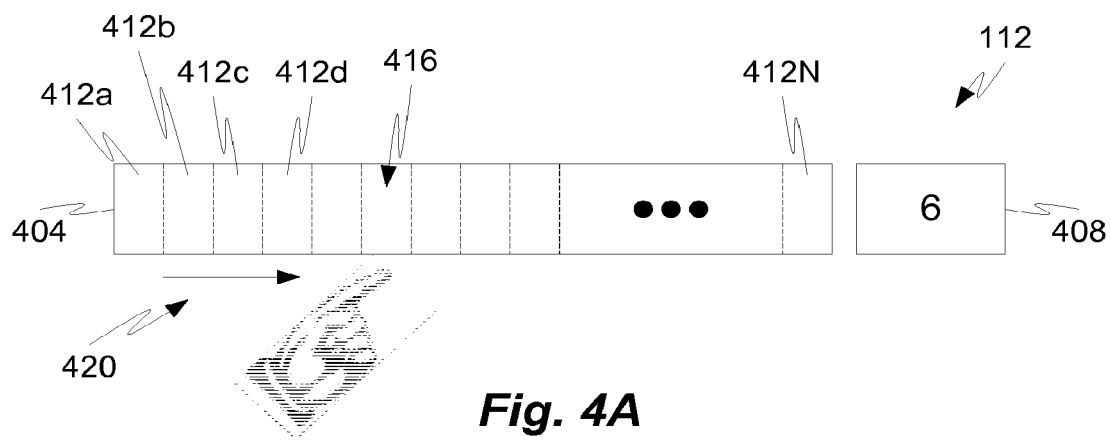
FIG. 4A is a block diagram depicting a first step of securely entering data via a user interface in accordance with embodiments of the present disclosure.

In some embodiments, during the first instance of user input depicted in FIG. 4A, the first input zone 412a may be assigned a first data value, the second input zone 412b may be assigned a second data value, the third input zone 412c may be assigned a third data value, and so on. When the user initially touches the first input zone 412a, the first data value may be displayed via the user output portion 408. While sliding, the user's finger transitions from the first input zone 412a to the second input zone 412b. Once a greater amount of the user's finger area is within the second input zone 412b instead of the first input zone 412a, the user output portion 408 displays the second data value instead of the first data value. The user continues moving their finger across the user input portion 404 until they reach the desired input zone 416, which corresponds to the data value that the user wants to enter. Upon reaching the desired input zone 416, the desired data value is depicted via the user output portion 408. When the user sees the desired data value in the user output portion 408, the user releases their finger from the user input portion 404 and the data value corresponding to the desired input zone 416 is entered as a first data input. In the example of FIG. 4A, the first data input corresponds to the data value of 6.

After the first instance of user input, the data values assigned to each input zone 412a-N may be re-assigned to new input zones. Alternatively, each input zone 412a-N may continue to have the same data value assigned thereto until a complete data entry has been completed or until an invalid data entry has been detected. In other words, it may be possible to re-assign data values to input zones 412a-N every time a new data input is received, after a complete valid password has been received, after the enter or clear input has been selected, or after an incomplete password has been received.

Moreover, the first data input may be provided from the UI driver 326 to the authentication module 312 immediately after it has been input by the user or it may be stored in cache memory until the user selects enter, at which time a series of data inputs is provided to the authentication module 312 for analysis.

Figure 4B:
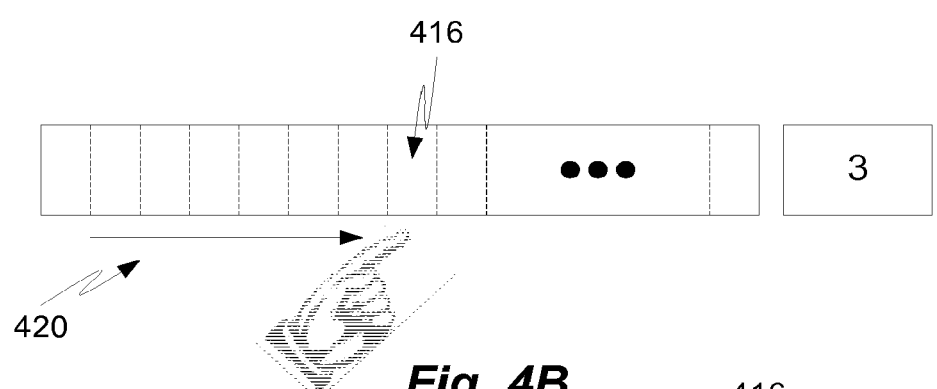
FIG. 4B is a block diagram depicting a second step of securely entering data via a user interface in accordance with embodiments of the present disclosure.

Following the first data input, the user may re-engage the user input portion 404 to provide a second instance of data input as is depicted in FIG. 4B. Although different data values may be assigned to the input zones 412a-N, the process for providing the data input is similar to the first instance of the data input. In particular, the user slides their finger across the input zones 412a-N of the user input portion 404 until their finger reaches the desired input zone 416. The user is able to determine that their finger is within the desired input zone 416 by monitoring the value displayed via the user output portion 408. Once the user's finger is within the desired input zone 416, the user releases their finger from the user input portion 404 and the data value corresponding to the desired input zone 416 is entered as a second data input. In the example of FIG. 4B, the second data input corresponds to the data value of 3.

Figure 4C:
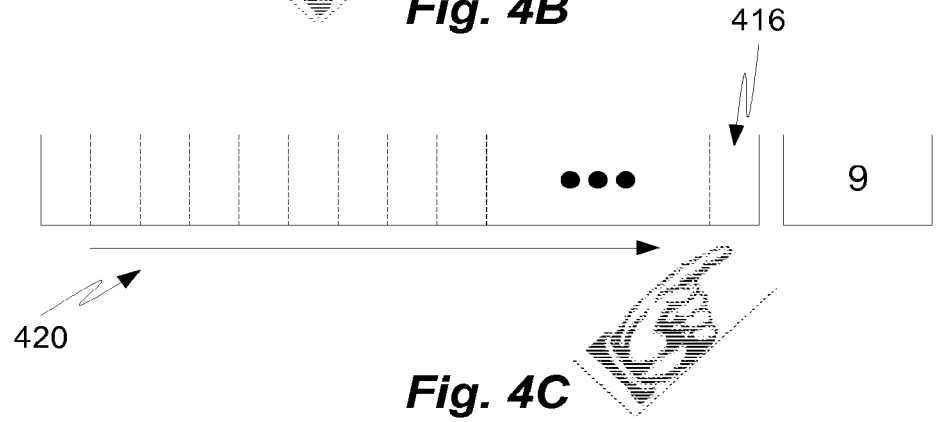
FIG. 4C is a block diagram depicting a third step of securely entering data via a user interface in accordance with embodiments of the present disclosure.

Following the second data input, the user may re-engage the user input portion 404 to provide a third instance of data input as is depicted in FIG. 4C. Again, the user slides their finger across the input zones 412a-N of the user input portion 404 until their finger reaches the desired input zone 416. Once the user's finger is within the desired input zone 416, the user releases their finger from the user input portion 404 and the data value corresponding to the desired input zone 416 is entered as a third data input. In the example of FIG. 4C, the third data input corresponds to the data value of 9.

Figure 4D:
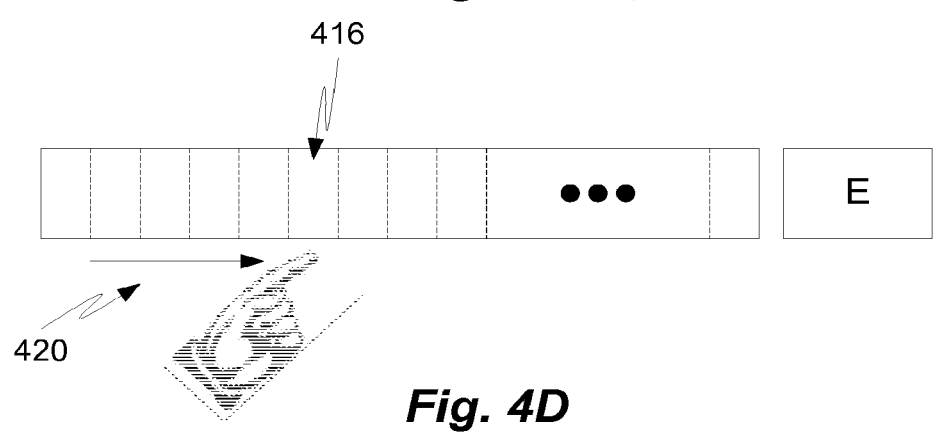
FIG. 4D is a block diagram depicting a fourth step of securely entering data via a user interface in accordance with embodiments of the present disclosure.

Assuming that a complete and valid data entry is "639", the user then has to engage the user input portion 404 to command the UI driver 328 to enter the complete data entry and provide the complete data entry to the authentication module 312. The enter command is entered in a similar fashion as the first, second, and third data inputs were entered. In particular, the user slides their finger across the input zones 412a-N of the user input portion 404 until their finger reaches the desired input zone 416. As can be seen in FIG. 4D, in this step of the process, the enter command is assigned to the desired input zone 416 instead of a data value. The user releases their finger from the user input portion 404 after they determine that their finger is within the desired input zone 416 and the enter command is provided to the UI driver 328, thereby causing the UI driver 328 to send the complete data entry to the authentication module 312 for analysis.

In some embodiments, however, if the code to be entered is a fixed number of digits, then the active implementation of an enter input is not required. In particular, the E key is not displayed and, instead, the data entry is complete after the last digit has been entered.

If the complete data entry corresponds to a valid user input, then the authentication module 312 may determine that the user is allowed to access whatever asset is being secured by the computational device 104, 204. In response to making such a determination, the computational device 104, 204 may allow the user access to whatever asset was previously secured.

With reference now to FIGS. 5A-F, a number of possible configurations of a user input portion 404 of a user interface 112 will be described in accordance with embodiments of the present disclosure. As discussed above, each input zone 412a-N may be assigned a different data value. The data value-to-input zone assignment may be configured to last permanently, for a predetermined amount of time, until a predetermined event occurs, and so on. As one example, each input zone 412a-N may have new data values assigned thereto after every instance of user input. As another example, the data values assigned to the input zones 412a-N may be flipped-flopped after every instance of user input or after every instance of a completed data entry. As another example, the data values assigned to the input zones 412a-N may vary between numeric data values and then alphabetical/character data values after every instance of user input. As another example, the spaces between input zones 412a-N or relative sizes of input zones 412a-N may be altered after every instance of user input or after every instance of a completed data entry. An another example, the data values assigned to the input zones 412a-N may be randomly re-assigned after every instance of user input or after every instance of a completed data entry. Combinations of the above examples may also be implemented.

By providing a user input portion 404 with the ability to have the data values assigned to the input zones 412a-N according to a number of different configurations, a more secure user interface 112 can be provided. In particular, changing the data values assigned to the input zones 412a-N helps ensure that a particular pattern cannot be discerned as corresponding to a valid input since the same values will likely be input with different patterns. The exemplary configurations of the data value-to-input zone assignments represent only a few of the many possible configurations (whether specifically discussed or not) may be utilized by the user interface 112.

Figure 5A:
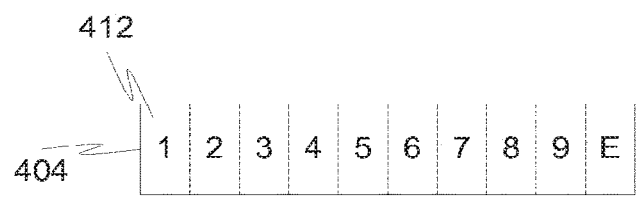
FIG. 5A is a block diagram depicting a first configuration of a user input in accordance with embodiments of the present disclosure.

Referring initially to FIG. 5A, a first exemplary configuration of a user input portion 404 is depicted where the data values are assigned incrementally to adjacent input zones 412 starting at the left and moving to the right.

Figure 5B:
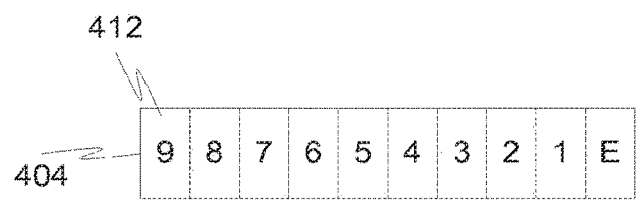
FIG. 5B is a block diagram depicting a second configuration of a user input in accordance with embodiments of the present disclosure.

With reference to FIG. 5B, a second exemplary configuration of a user input portion 404 is depicted where the data values are assigned decrementally to adjacent input zones 412 starting at the left and moving to the right.

Figure 5C:
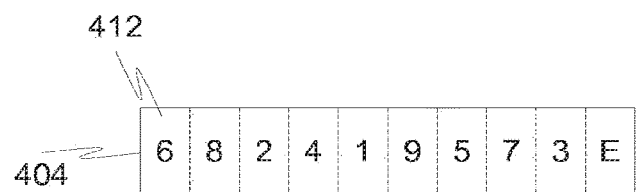
FIG. 5C is a block diagram depicting a third configuration of a user input in accordance with embodiments of the present disclosure.

With reference to FIG. 5C, a third exemplary configuration of a user input portion 404 is depicted where the data values are assigned randomly to the input zones 412. In the first, second, and third exemplary configurations, the enter command is assigned to the Nth input zone 412N. As can be appreciated, certain configurations may allow the enter command to be assigned to some input zone 412 that is surrounded by at least two input zones 412.

Figure 5D:
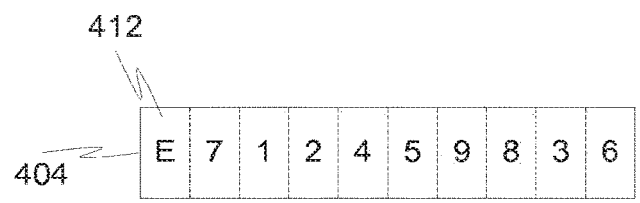
FIG. 5D is a block diagram depicting a fourth configuration of a user input in accordance with embodiments of the present disclosure.

With reference to FIG. 5D, a fourth exemplary configuration of a user input portion 404 is depicted where the data values are assigned randomly to the input zones 412 and the enter command is assigned to the first input zone 412a.

Figure 5E:
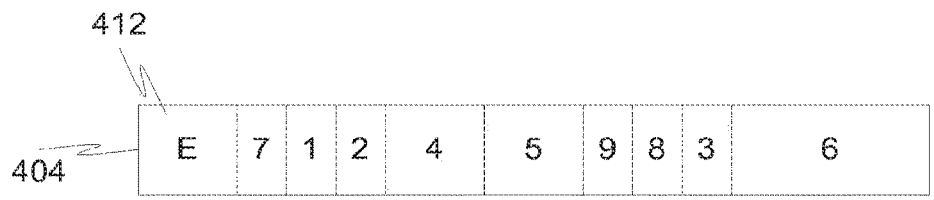
FIG. 5E is a block diagram depicting a fifth configuration of a user input in accordance with embodiments of the present disclosure.

With reference to FIG. 5E, a fifth exemplary configuration of a user input portion 404 is depicted where the size of each input zone 412 varies from one input zone to the next. The alteration of size/area of input zones 412 may be coupled with other configurations described herein to further enhance the security of the user interface 112.

Figure 5F:
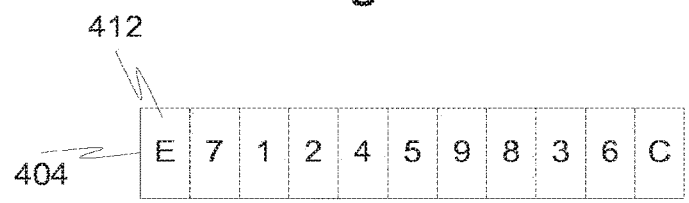
FIG. 5F is a block diagram depicting a sixth configuration of a user input in accordance with embodiments of the present disclosure.

With reference to FIG. 5F, a sixth exemplary configuration of a user input portion 404 is depicted where data values are assigned to all but two of the input zones 412a-N, the enter command is assigned to the first input zone 412a, and a clear command is assigned to the Nth input zone 412N. In some embodiments, the clear command can be used to delete the last data value that was entered by a user or to delete a complete data entry.

Figure 6:
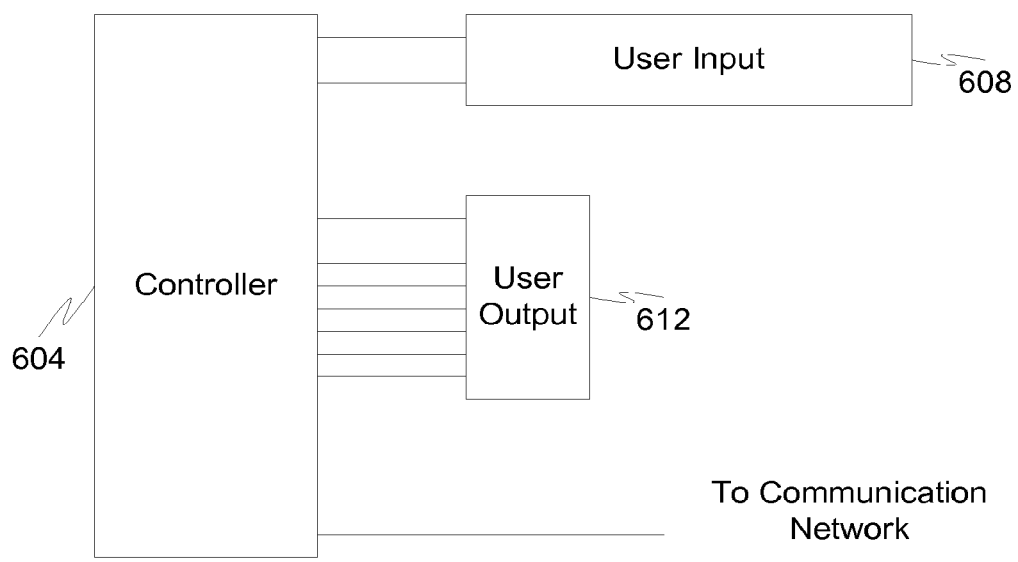
FIG. 6 is a block diagram depicting details of a secure user interface in accordance with embodiments of the present disclosure.

With reference now to FIG. 6, exemplary components of a user interface 112 are depicted in accordance with at least some embodiments of the present disclosure. The components used to construct the user interface 112 provide both a secure mechanism for capturing user input as well as a cost-effective alternative to the Hirsch ScramblePad® and similar secure data-entry technologies. In some embodiments, the user interface 112 may comprise a controller 604 which includes one or more links to a user input 608, one or more links to a user output 612, and one or more links to a communication network. In some embodiments, the controller 604 corresponds to a microcontroller and may be implemented as part or all of the processor 336.

The user input 608 may correspond to a linear potentiometer (resistive or capacitive) which is configured to detect pressure applied thereto and a location of such pressure and provide an output electrical signal to the controller 604 in response thereto. The controller 604 may be configured to analyze the electrical signals received from the user input 608, determine a data value associated with such electrical signals, and send a command to the user output 612 which causes the user output 612 to display the data values so that they can be perceived by the user. In some embodiments, the user output 612 corresponds to a single or multiple digit seven segment LED/LCD display and the controller 604 may comprise an 8 bit or higher analog-to-digital converter which converts analog signals received from the user input 608 into digital signals for transmission to the user output 612.

The connection to the communication network may be implemented as any type of known communication interfaces 344. Examples of such communication interfaces 344 include, without limitation, a Wiegand port, an RS485 output, an Ethernet port, a USB port, and the like.

Figure 7:
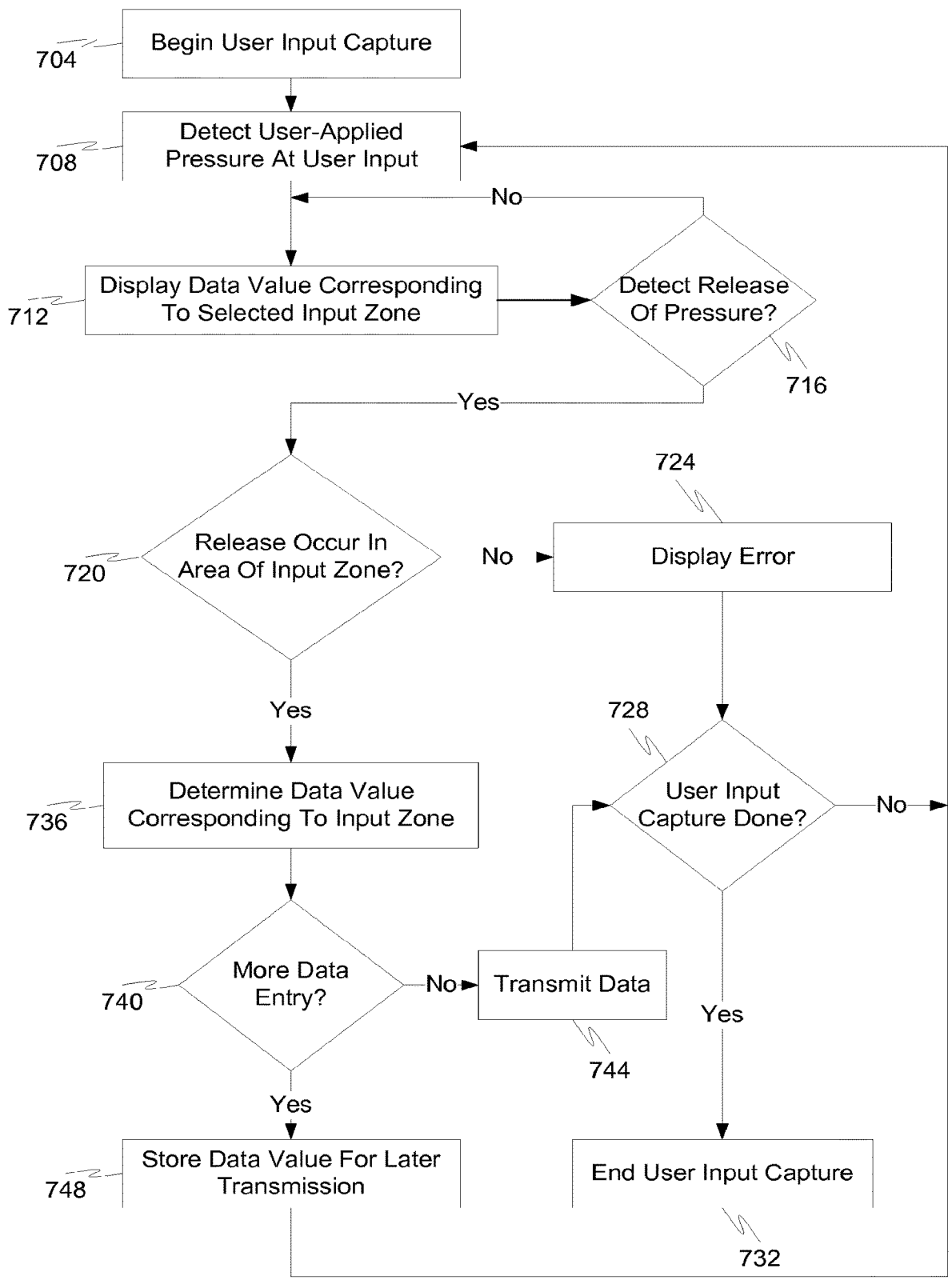
FIG. 7 is a flow diagram depicting a user input capture method in accordance with embodiments of the present disclosure.

With reference now to FIG. 7, an exemplary user input capture method will be described in accordance with at least some embodiments of the present disclosure. The method begins at step 704 and continues when user interaction with the user interface 112 is detected (step 708). In some embodiments, detection of user activity at the user interface 112 may trigger the initiation of the user input capture method. Additionally, the way in which user activity is detected at the user interface 112 will depend on the type of user interface 112 being utilized. In particular, if a user interface 112 is employed that includes a pressure-sensitive user input portion 404, then detection of user activity occurs when pressure is detected as being applied at a concentrated point or area within the user input portion 404. If a user interface 112 is employed that includes an optical user input portion 404, then detection of user activity occurs when one or more images are captured which indicate that a user has touched the user input portion 404.

Assuming that a pressure-sensitive user input portion 404 is being utilized, the method continues with the controller 604 or UI driver 328 determining the data value corresponding to the currently selected input zone 412 and causing the determined data value to be displayed via a user output portion 408 of the user interface 112 (step 712).

Thereafter, the controller 604 or UI driver 328 determines if the release of pressure has been detected (step 716). The amount of pressure release required to affirmatively answer the query of step 716 may vary depending upon tolerances of the user input portion 404, environmental factors, and the like. In some embodiments, a complete release of pressure (i.e., a reading of ambient pressure only) may be required to satisfy the query of step 716. Alternatively, the pressure may only need to be decreased by a predetermined amount or by a predetermined percentage of the maximum pressure detected during step 708.

If the release of pressure has not been detected, then the method returns to step 712 and a new data value is determined and displayed if the user scrolls their finger into a new input zone 412 of the user input portion 404.

If, however, the query of step 716 is answered affirmatively, then the method continues with the controller 604 or UI driver 328 determining if the release occurred within a defined input zone 412 having a data value or command associated therewith (step 720). If not, then an error message is displayed via the user output portion 408 (step 724). Thereafter, the determination is made as to whether the user input capture method is done (step 728). This query may be answered negatively if user input is again detected at the user input portion 404 within a predetermined amount of time after the error message was displayed. Conversely, the query of step 728 may be answered affirmatively if a predetermined number of errors occurred within a predetermined amount of time or if some other user input was detected which suggests that the computational device 104, 204 is under a potential attack. For example, if the user engages a panic input (e.g., by applying a pressure at the user input portion 404 that is greater than a predetermined pressure threshold), then the query of step 728 may be answered affirmatively. If the query of step 728 is answered affirmatively, then the user input capture method is concluded (step 732). In some embodiments, an additional step of temporarily disabling some or all functionality of the computational device 104, 204 may be performed if it is determined that the computational device 104, 204 is potentially under attack.

If the query of step 728 is answered negatively, then the method returns to step 708.

Referring back to step 720, if the user releases the user input portion 404 within an input zone having a data value assigned thereto, then the controller 604 or UI driver 328 determines the data value currently corresponding to the input zone 412 where the pressure was last detected (e.g., where the release was detected) (step 736).

The data value determined during the first iteration of step 736 may correspond to a first data input. The method continues by determining whether or not there will be more data entry before data is transmitted to the authentication module 312 for analysis (step 740). If no additional data capture is necessary (e.g., the user has selected the enter command or data inputs are provided to the authentication module 312 or networked device 108 sequentially rather than as a string of data values), then the first data input is transmitted to the authentication module 312 for analysis (step 744). Alternatively, the first data input may be transmitted to a networked device 108 for analysis. Thereafter, the method continues to step 728 to determine whether additional data inputs are being received or whether the user input capture method is complete.

Referring back to step 740, if additional data capture is necessary (e.g., the user has not selected the enter command or data inputs are provided to the authentication module 312 or networked device 108 as a string of data values rather than sequential inputs), then the first data input is stored in a cache memory for later transmission with other data inputs that are yet to be captured (step 748). Thereafter, the method returns to step 708 to begin the process of capturing the second data input, third data input, and so on until the user selects the enter command or until a predetermined number of data inputs have been captured.

Figure 8:
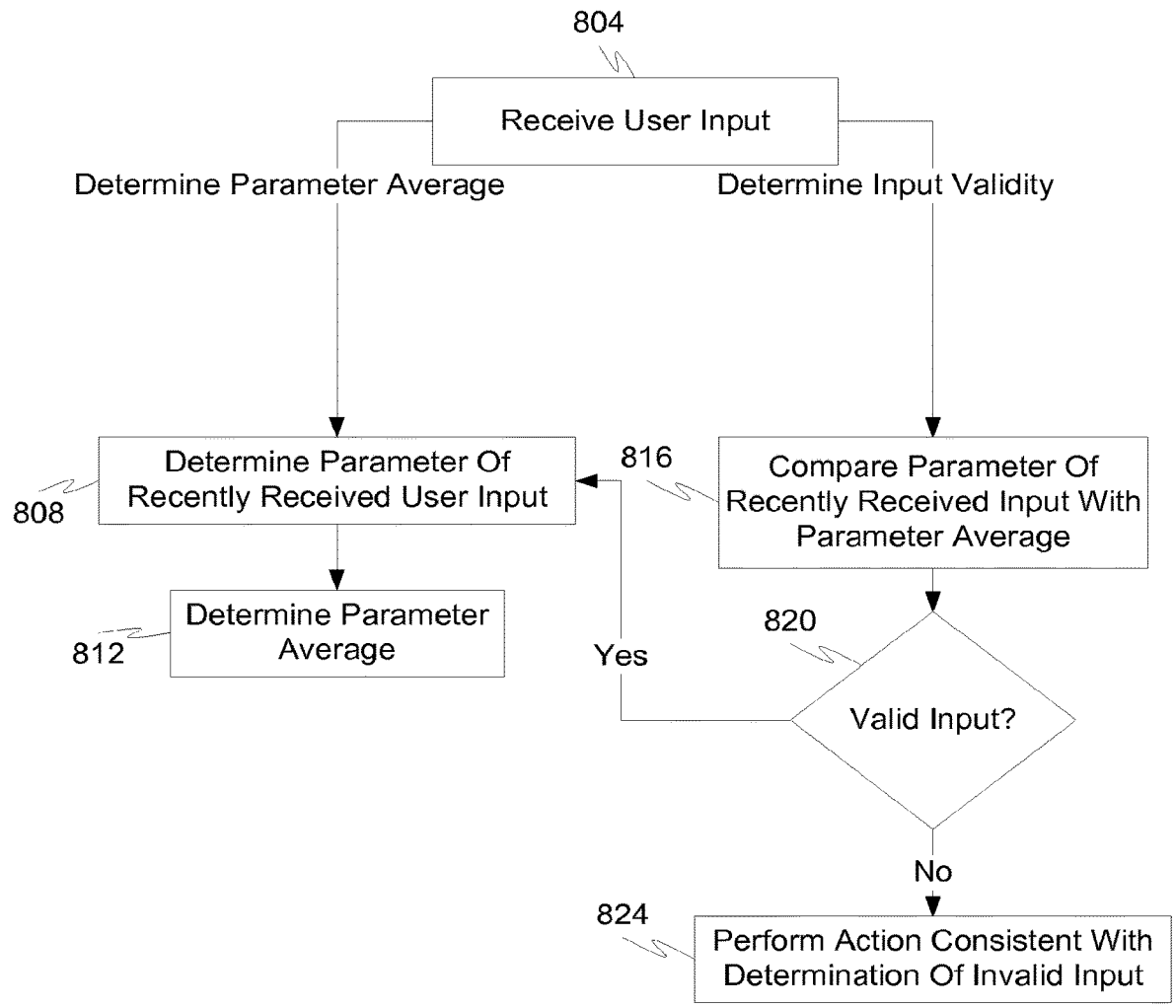
FIG. 8 is a flow diagram depicting a user input analysis method in accordance with embodiments of the present disclosure.

With reference now to FIG. 8, an exemplary user input analysis method will be described in accordance with at least some embodiments of the present disclosure. The method begins when user input is received at the user interface 112 (step 804). Thereafter, the method may proceed down one of two paths depending upon a number of considerations. One path corresponds to a process of determining a user input parameter average (or other result obtained from a different mathematical formula), whereas the other path corresponds to a process of analyzing the currently received user input based on a historical user input parameter average to determine if the currently received user input is suspect. The analysis process is generally not performed until a predetermined and suitable number of user inputs have been received such that a user input parameter average is determined and the standard deviation of the user input parameters used to calculate the average is less than a predetermined threshold value.

If the method continues only with the process of determining a user input parameter average, then one or more parameters of interest are determined for the recently received user input (step 808). Exemplary parameters of interest which may be determined in this step include amount of pressure applied to the user input portion 404, size of finger, fingerprints or fingerprint characteristics, slide speed, and so on. The determined parameter(s) of interest determined for the recently received user input are then used to determine an average of the parameter(s) of interest (step 812). The average values may be based on all user inputs received or based only on valid user inputs received.

Referring back to step 804, if the method continues with the process of determining user input validity (i.e., the analysis process), then the method continues with the authentication module 312 comparing one or more parameters of interest from the recently received user input with averages of the corresponding one or more parameters of interest (step 816). Based on the comparison of step 816, the authentication module 312 determines if the parameter(s) of interest for the recently received user input are valid (step 820). In this step, the authentication module 312 may determine that user inputs are invalid or suspect if they have a parameter of interest which deviates from the average by more than a predetermined threshold value (i.e., by either exceeding or falling below the average).

Accordingly, if the query of step 820 is answered negatively, then the computational device 104, 204 may perform one or more actions which are consistent with determining that an invalid or suspect user input has been received (step 824). Such actions may include slowing down the rate at which entries are accepted by the computational device 104, 204, temporarily disabling functionality of the computational device 104, 204, permanently disabling functionality of the computational device 104, 204, transmitting a message to security personnel, sounding an alarm, combinations thereof, or the like.

If, however, the query of step 820 is answered affirmatively, then the method may continue with the process of determining a user input parameter average.

A number of extensions and alternative implementations are considered to be within the scope of the present disclosure. As one example, a linear potentiometer is not the only type of user input portion 404 that can be utilized to achieve a cost-effective but secure user interface 112. Rather, the use of a touch screen configured to simultaneously detect and analyze multiple inputs can be utilized. In such an implementation in addition to sliding motions, different gesturing motions, such as pinching, could be utilized to select individual digits. In particular, if a pinching gesture is utilized to achieve a user input, then the relative distance between the user's two fingers may be correlated to the input zones 412 described above. A very small distance (e.g., 1-5 mm) between the user's two fingers may correspond to the Nth input zone 412N whereas a very larger distance (e.g., 10-20 cm) between the user's two fingers may correspond to the first input zone 412a. All other aspects of the present disclosure may be performed in substantially the same way as described. Specifically, there could be separate pinch zones for each data value in a multi-digit entry.

As another possible extension contemplated by the present disclosure, the electronics of the user interface 112 including the controller 604, the connections between the controller 604, the user input 608, and the user output 612 may be potted in a potting material, thereby making the user interface 112 substantially weather resistant.

As another possible extension contemplated by the present disclosure, a pressure sensitive device could be used to select data inputs where different magnitudes of applied pressure correspond to the input zones 412 described above. A number of different magnitudes of applied pressure may have different data values assigned thereto. As the user presses the user input portion 404 harder, the different data values may be displayed via the user output 408. When the desired data value is displayed via the user output 408, the user may completely release the user input portion 404 and the data value corresponding to the last-displayed data value is selected as the data input. The value may correspond to a digit, an enter command, a clear command, or a series of input commands.

The use of a pressure sensor may also enable additional inputs without requiring the user to slide their finger across the user input portion 404. In particular, a user may press the user input portion 404 extra "hard" (e.g., applies a pressure greater than a predetermined amount of pressure) to signify: (1) that data entry is complete; (2) that one or more previous entries should be erased; or (3) that the user is under duress and security personnel should be notified.

In another possible extension contemplated by the present disclosure, a reserved code can be utilized to enter a "programming mode" where the configuration data 324 can be changed. For example, the configuration data 324 may define how configurations of the user input portion 404 are scrambled between user inputs, the number of digits to be displayed via the user output portion 408, data output formats, the programming mode code, a list of one or more input passwords that will unlock access to the asset, etc. During the programming mode, one or more of these operating characteristics can be modified.

In another possible extension, a biometric swipe sensor may be designed to utilize some or all of the concepts disclosed herein. Specifically, the biometric swipe sensor can be configured to detect partial swipes of a user's finger and correlate different amounts of partial swipes to a different input value. During such partial swipes, the user's finger print may also be analyzed as a second factor of authentication.

In the foregoing description, for the purposes of illustration, methods were described in a particular order. It should be appreciated that in alternate embodiments, the methods may be performed in a different order than that described. It should also be appreciated that the methods described above may be performed by hardware components or may be embodied in sequences of machine-executable instructions, which may be used to cause a machine, such as a general-purpose or special-purpose processor or logic circuits programmed with the instructions to perform the methods. These machine-executable instructions may be stored on one or more machine readable mediums, such as CD-ROMs or other type of optical disks, floppy diskettes, ROMs, RAMs, EPROMs, EEPROMs, SIMs, SAM,s, magnetic or optical cards, flash memory, or other types of machine-readable mediums suitable for storing electronic instructions. Alternatively, the methods may be performed by a combination of hardware and software.

Specific details were given in the description to provide a thorough understanding of the embodiments. However, it will be understood by one of ordinary skill in the art that the embodiments may be practiced without these specific details. For example, circuits may be shown in block diagrams in order not to obscure the embodiments in unnecessary detail. In other instances, well-known circuits, processes, algorithms, structures, and techniques may be shown without unnecessary detail in order to avoid obscuring the embodiments.

Also, it is noted that the embodiments were described as a process which is depicted as a flowchart, a flow diagram, a data flow diagram, a structure diagram, or a block diagram. Although a flowchart may describe the operations as a sequential process, many of the operations can be performed in parallel or concurrently. In addition, the order of the operations may be re-arranged. A process is terminated when its operations are completed, but could have additional steps not included in the figure. A process may correspond to a method, a function, a procedure, a subroutine, a subprogram, etc. When a process corresponds to a function, its termination corresponds to a return of the function to the calling function or the main function.

Furthermore, embodiments may be implemented by hardware, software, firmware, middleware, microcode, hardware description languages, or any combination thereof. When implemented in software, firmware, middleware or microcode, the program code or code segments to perform the necessary tasks may be stored in a machine readable medium such as storage medium. A processor(s) may perform the necessary tasks. A code segment may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, parameters, or memory contents. Information, arguments, parameters, data, etc. may be passed, forwarded, or transmitted via any suitable means including memory sharing, message passing, token passing, network transmission, etc.

While illustrative embodiments of the disclosure have been described in detail herein, it is to be understood that the inventive concepts may be otherwise variously embodied and employed, and that the appended claims are intended to be construed to include such variations, except as limited by the prior art.

What is claimed is:

1. A method of securely receiving user input at a computational device, the method comprising:
    during a first instance of user input:
        providing a first user input portion at a user interface of the computational device, the first user input portion comprising a first plurality of input zones having a first configuration of at least one of respective input zone sizes or input zone values;
        detecting a first user engagement with the first user input portion at a first input zone of the first plurality of input zones;
        determining a first data value corresponding to the first input zone;
        displaying the first data value to the user via a user output;
        detecting a change in the first user engagement with the first user input portion from the first input zone to a second input zone of the first plurality of input zones;
        determining a second data value corresponding to the second input zone;
        displaying the second data value to the user via the user output;
        determining that the user has disengaged the first user input portion at the second input zone; and
        in response to determining that the user has disengaged the first user input portion at the second input zone, conditioning the second data value as first input data for the computational device; and
    during a second instance of user input:
        providing a second user input portion at the user interface of the computational device, the second user input portion comprising a second plurality of input zones having a second configuration of at least one of respective input zone sizes or input zone values, wherein the second configuration is defined without requiring user intervention to be different than the first configuration;
    wherein the first input data is provided as part of a password or access code comprising a finite series of data entry values received at the user interface of the computational device.

2. The method of claim 1, further comprising transmitting the first input data to an authentication module for comparison with authentication data.

3. The method of claim 2, wherein the authentication module is contained within the computational device.

4. The method of claim 1, wherein the user interface comprises a linear potentiometer and wherein the user output comprises a separate display unit.

5. The method of claim 4, wherein the linear potentiometer is at least one of a resistive and capacitive linear potentiometer and wherein the user output comprises an LED display.

6. The method of claim 1, further comprising:
    during the second instance of user input:
        detecting a second user engagement with the second user input portion at a third input zone of the second plurality of input zones;
        determining a third data value corresponding to the third input zone;
        displaying the third data value to the user via the user output; and in response to determining that the user has disengaged the second user input portion at the third input zone, conditioning the third data value as second input data for the computational device.

7. The method of claim 1, wherein the user interface comprises a touch pad configured to detect and process multiple simultaneous user engagements.

8. The method of claim 7, wherein the first input zone comprises a first pinch zone defined by a first distance between two simultaneous user engagements.

9. The method of claim 1, wherein the user output is configured to substantially prevent off-axis viewing of the user output.

10. The method of claim 1, further comprising:
determining, for the first user engagement at the first input zone, a first value of a user input parameter of interest;
determining, for the first user engagement at the second input zone, a second value of the user input parameter of interest; and
determining an average value of the user input parameter of interest based, at least in part, on the first and second values of the user input parameter of interest.

11. A computer-readable storage device comprising processor-executable instructions that, when executed by a processor of the computational device, perform the method of:
during a first instance of user input:
providing a first user input portion at a user interface of the computational device, the first user input portion comprising a first plurality of input zones having a first configuration of at least one of respective input zone sizes or input zone values;
detecting a first user engagement with the first user input portion at a first input zone of the first plurality of input zones;
determining a first data value corresponding to the first input zone;
displaying the first data value to the user via a user output;
detecting a change in the first user engagement with the first user input portion from the first input zone to a second input zone of the first plurality of input zones;
determining a second data value corresponding to the second input zone;
displaying the second data value to the user via the user output;
determining that the user has disengaged the first user input portion at the second input zone; and
in response to determining that the user has disengaged the first user input portion at the second input zone, conditioning the second data value as first input data for the computational device; and
during a second instance of user input:
providing a second user input portion at the user interface of the computational device, the second user input portion comprising a second plurality of input zones having a second configuration of at least one of respective input zone sizes or input zone values, wherein the second configuration is defined without requiring user intervention to be different than the first configuration;
providing the first input data as part of a password or access code comprising a finite series of data entry values received at the user interface of the computational device.

12. A computational device, comprising:
a user interface configured to receive user engagement and display user output; and
a computer-readable storage device storing computer-executable instructions configured to:
during a first instance of user input:
provide a first user input portion at the user interface, the first user input portion comprising a first plurality of input zones having a first configuration of at least one of respective input zone sizes or input zone values;
detect a first user engagement with the first user input portion at a first input zone of the first plurality of input zones;
determine a first data value corresponding to the first input zone;
cause the first data value to be displayed via the user interface;
detect a change in the first user engagement with the first user input portion from the first input zone to a second input zone of the first plurality of input zones;
determine a second data value corresponding to the second input zone;
cause the second data value to be displayed via the user interface;
determine that the user has disengaged the first user input portion at the second input zone; and
in response to determining that the user has disengaged the first user input portion at the second input zone, condition the second data value as first input data for the computational device; and
during a second instance of user input:
provide a second user input portion at the user interface, the second user input portion comprising a second plurality of input zones having a second configuration of at least one of respective input zone sizes or input zone values, wherein the second configuration is defined without requiring user intervention to be different than the first configuration;
providing the first input data as part of a password or access code comprising a finite series of data entry values received at the user interface of the computational device.

13. The device of claim 12, further comprising a communication interface configured to transmit the second data value to a networked device.

14. The device of claim 12, wherein the user interface comprises a linear potentiometer to receive the first and second user engagements.

15. The device of claim 12, wherein the user interface comprises an optical input to receive the first and second user engagements.

16. The device of claim 12, wherein a portion of the user interface configured to receive user engagement is physically separated from a portion of the user interface configured to display user output.

17. The method of claim 6, wherein the first and second input data are combined as a string input.

18. The method of claim 1, further comprising:
during the second instance of user input:
detecting a second user engagement with the second user input portion at a third input zone of the second plurality of input zones;
determining a third data value corresponding to the third input zone;

displaying the third data value to the user via the user output;

detecting a change in the second user engagement with the second user input portion from the third input zone to a fourth input zone of the second plurality of input zones;

determining a fourth data value corresponding to the fourth input zone;

displaying the fourth data value to the user via the user output;

determining that the user has disengaged the second user input portion at the fourth input zone; and in response to determining that the user has disengaged the second user input portion at the fourth input zone, conditioning the fourth data value as second input data for the computational device.

19. The method of claim 8, wherein the second input zone comprises a second pinch zone defined by a second distance, different than the first distance, between two simultaneous user engagements.

20. The computational device of claim 12, wherein the computer executable instructions are further configured to:

during the second instance of user input:

detect a second user engagement with the second user input portion at a third input zone of the second plurality of input zones;

determine a third data value corresponding to the third input zone;

cause the third data value to be displayed via the user interface; and in response to determining that the user has disengaged the second user input portion at the third input zone, conditioning the third data value as second input data for the computational device.

21. The computational device of claim 20, wherein the first and second input data are combined as a string input.

* * * * *